United States Patent
Sun et al.

(10) Patent No.: US 12,422,669 B2
(45) Date of Patent: Sep. 23, 2025

(54) SELF-ALIGNED MASK FOR HUMIDITY BARRIER PATTERNING

(71) Applicant: Microsoft Technology Licensing, LLC, Redmond, WA (US)

(72) Inventors: Di Sun, Bothell, WA (US); Xiao Chuan Ong, Seattle, WA (US); Seungwoo Lee, Redmond, WA (US); Wyatt Owen Davis, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 505 days.

(21) Appl. No.: 18/054,886

(22) Filed: Nov. 11, 2022

(65) Prior Publication Data
US 2024/0160009 A1    May 16, 2024

(51) Int. Cl.
*G02B 26/10* (2006.01)
*G02B 26/08* (2006.01)

(52) U.S. Cl.
CPC ....... *G02B 26/105* (2013.01); *G02B 26/0858* (2013.01)

(58) Field of Classification Search
CPC ..... G02B 26/101; G02B 26/10; G02B 26/105
See application file for complete search history.

(56) References Cited

U.S. PATENT DOCUMENTS

| 9,682,854 | B2 | 6/2017 | Man et al. |
| 2004/0248417 | A1 | 12/2004 | Malone |
| 2009/0142227 | A1 | 6/2009 | Fuchs et al. |
| 2011/0138902 | A1 | 6/2011 | White et al. |
| 2021/0018746 | A1 | 1/2021 | Ellis |
| 2021/0380400 | A1 | 12/2021 | Leber et al. |
| 2022/0075180 | A1* | 3/2022 | Konno ............... G02B 26/105 |
| 2022/0252868 | A1* | 8/2022 | Sarkar ............... G02B 26/106 |

FOREIGN PATENT DOCUMENTS

| KR | 101218115 B1 | 1/2013 | |
| WO | WO-2009041564 A1 * | 4/2009 | ......... G02B 26/0858 |
| WO | 2022008338 A1 | 1/2022 | |

OTHER PUBLICATIONS

Selvarasah, et al., "A reusable High Aspect Ratio Parylene-C Shadow Mask Technology for Diverse Micropatterning Applications", In Journal of Sensors and Actuators A: Physical, vol. 145-146, Jul. 2008, pp. 306-315.
International Search Report and Written Opinion received for PCT Application No. PCT/US23/033773, Jan. 22, 2024, 11 pages.
International preliminary report on patentability Received in European Patent Application No. PCT/US23/033773, mailed on May 22, 2025, 07 pages.

* cited by examiner

*Primary Examiner* — Alexander P Gross
(74) *Attorney, Agent, or Firm* — Schwegman Lundberg & Woessner, P.A.

(57) ABSTRACT

A method includes forming a mirror assembly for a scanning device that includes a mirror rotationally supported by flexible beams, the mirror assembly also including a piezoelectric material. The mirror is encased with a cover having a top scanning opening aligned with the mirror to form a scanning assembly. An interior of the scanning assembly is coated with a protective film. Etching is performed through the top scanning opening to remove the protective film from a top of the mirror.

20 Claims, 9 Drawing Sheets

(A) DI-PARA-XYLYLENE (DIMER) 450

(B) DI-PARA-XYLYLENE (MONOMER) 460

(C) POLY(PARA-XYLYLENE) (MONOMER) 470

SELF-ALIGNED MASK FOR HUMIDITY BARRIER PATTERNING

BACKGROUND

Small oscillating mirrors may be used to reflect laser generated light for head mounted displays. The mirrors may be formed by etching blocks of semiconductor material, essentially removing material from the block around and underneath the mirror to create a cavity around the mirror. A pair of flexible arms couple the mirror to the remaining block of material. The arms allow the mirror to oscillate around a lengthwise axis of the arms in the cavity.

One or more piezoelectric components are used to actuate the oscillation of the mirror at a desired frequency and amplitude.

Protectively coating the piezoelectric components can protect them from degradation caused by exposure to humid environments. The same coating can adversely affect the reflectivity of the mirror and change the resonant frequency of the mirror leading to poor display of information on the head mounted display.

SUMMARY

A method includes forming a mirror assembly for a scanning device that includes a mirror rotationally supported by flexible beams, the mirror assembly also including a piezoelectric material. The mirror is encased with a cover having a top scanning opening aligned with the mirror to form a scanning assembly. An interior of the scanning assembly is coated with a protective film. Etching is performed through the top scanning opening to remove the protective film from a top of the mirror.

DETAILED DESCRIPTION

Figure 1:
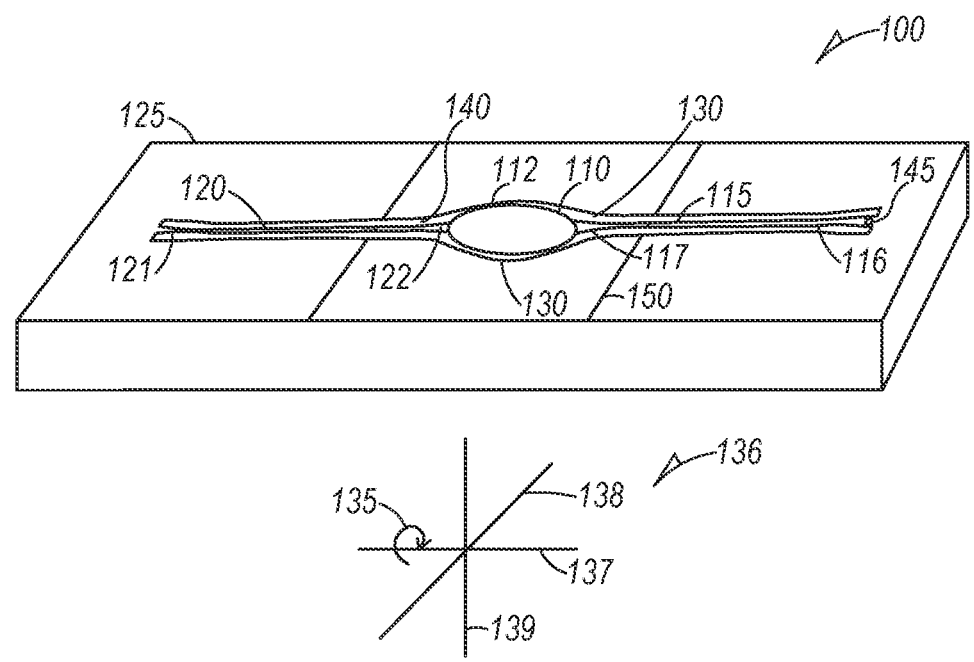
FIG. 1 is a block perspective diagram of a scanning device according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Piezoelectric actuators have been widely used as actuators in laser MEMS scanners to rotate a mirror supported by beams as it oscillates in a rotating manner about an axis along the beam. Piezoelectric actuators may be directly fabricated on a laser MEMS (micro-electromechanical systems) scanner device layer surface, which may be silicon in one example. The silicon may be intrinsic or doped. Silicon is an elastic material with low material losses, has very high strength, and can be easily micromachined.

Thin film piezoelectric materials used to actuate the mirror suffer degradation in humid environments. Elemental migration, electrochemical activity toward water electrolysis, and high electrocatalytic activity can occur in $PbZr_xTi_{1-x}O_3$ (PZT) films resulting in cracking and local breakdown. In order to protect the PZT from the humid environment and achieve high reliability, thin film coatings are required. Polymeric material with light weight, good flexibility, low moisture permeability and conformal coating characteristics provides a good moisture barrier choice.

In applying such a protective coating to MEMS scanning devices, mirrors may also be coated during a chemical vapor deposition of the coating on an MEMS scanning device assembly. Mirrors with protective coating do not reflect light as well as uncoated mirrors. High reflectivity is beneficial for scanning devices. In addition, the weight of the coating can cause an undesirable resonance shift of the laser MEMS scanning mirror assembly after coating. Removal of the coating from the mirror at the assembly level, can be difficult using traditional microfabrication patterning process like photoresist photolithography.

In one example, the protective coating is removed from the mirror using reactive ion etching (RIE) with a cover of the MEMS scanning device acting as a shadow mask. The mask in one example includes an opening in the cover that is self-aligned with the mirror. The opening may be the same opening used to allow laser light to the mirror for scanning purposes. An additional opening may be provided through a scanning device mounting printed circuit board to expose a back side of the mirror and assist with alignment during display engine integration.

General construction of an example scanning MEMS assembly is described, followed by a description of how the protective coating is applied and selectively removed from the mirror using RIE and a self-aligned mask.

FIG. 1 is a block perspective diagram of a mirror assembly scanning device 100 that operates as a MEMS scanning mirror for a display system. Scanning device 100 may include a mirror 110 that includes a reflective coating 112 formed on atop surface of the mirror 110. The reflective coating 112 may be formed of aluminum in one example, such as 100 nm thick Al, deposited or otherwise attached to the mirror 110. A pair of flexible arms or torsional flexure beams 115 and 120 have first ends 116 and 121 respectively coupled to a block 125 of semiconductor material and extend laterally towards each other in a cantilevered manner. In one example, the beams may be formed about 20 um-500 um thick.

The mirror 110 has two ends that are rotatingly coupled to respective seconds ends 117 and 122 of the flexible beams 115 and 120. The beams and mirror platform may be formed from the block 125 and are disposed within a cavity 130 that allows the mirror 110 to rotate near its resonant frequency about a lengthwise axis extending through the mirror platform and between the first and second ends of the beams 115 and 120. The direction of rotation is represented by arrow 135 in a coordinate system representation 136. The direction of the lengthwise axis is represented at 137, width at 138, and depth at 139.

The cavity 130 is formed in one example by etching or otherwise removing material in the block 125 of material about the mirror platform and beams with a depth, width, and length sufficient to allow the mirror platform to rotate about the lengthwise axis along the beams. Cavity 130 may have sidewalls, such as sidewall 140 that extends from the top surface of the block 125 to a bottom of the cavity 130. The formation of the cavity 130 may be done in a conventional manner such as by deep reactive ion etching (DRIE) of the block 125 and a handle layer attached to the block 125 to form the beams 115, 120 and mirror 110 followed by a box layer release. The block 125 may be supported by a ceramic substrate in one example to provide structural support.

A piezoresistive sensor 145 is coupled near the second end of beam 115 in a manner that causes a change in resistance in response to mechanical stress or strain in the tensor arm or beam 115 representative of a rotation angle of the oscillating mirror 110. The piezoresistive sensor 145 may be formed by doping the block 125 material to form a piezoresistor and may be used to generate electrical signals representative of mirror 110 oscillation amplitude, frequency, and phase.

Scanning device 100 in one example is used to reflect light from multiple lasers onto a display screen for displaying information. Two scanners may be used in one example. One scanner may be used to reflect the light in a vertical direction with respect to the display screen and another scanner may be used to direct light in a horizontal direction. The lasers may direct red, green, and blue light pulses that are timed to be reflected to precise areas corresponding to pixels at the right times. The timing of the pulses is controlled to form an accurate representation of the information to be displayed in a common manner. The accuracy of the timing and hence location of the light on the display screen is dependent on the measured angle of the reflective coating 112 on the mirror 110.

In one example, the reflective coating 112 extends an entire width of the mirror 110. The mirror 110 and beams 115 and 120 are formed from the semiconductor block.

Figure 2:
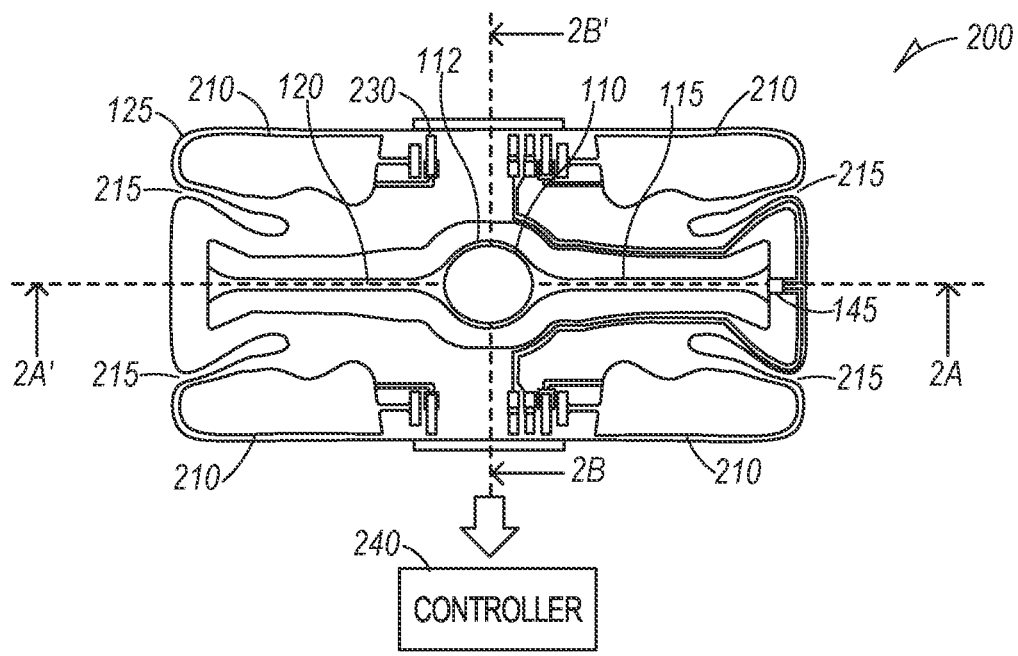
FIG. 2 is a top view block representation of a scanning device according to an example embodiment.

FIG. 2 is a top view block representation of a mirror assembly 200 prior to application of light blocking portions. This figure is provided to better show how control of the oscillation is performed. Like elements are identified with the same reference numbers as like elements of FIG. 1.

Components used to actuate the mirror 110 are illustrated. In one example, piezoelectric, such as PZT, actuators 210 are formed about the second ends of the beams 115 and 120. The actuators 210 are supported by the block 125. Openings 215 are formed between the actuators 210 and the beams 115 and 120. Contact pads 230 are formed and connected to the actuators 210 and sensor 145 via multiple conductors. The contact pads 230 and conductors may be formed using known metallization processes. The contact pads 230 are also coupled to a controller 240.

Controller 240 receives sensor signals and controls the actuators to deform in a manner to maintain oscillation at a desired frequency and amplitude. Such control is performed in a closed loop manner.

Figure 3A:
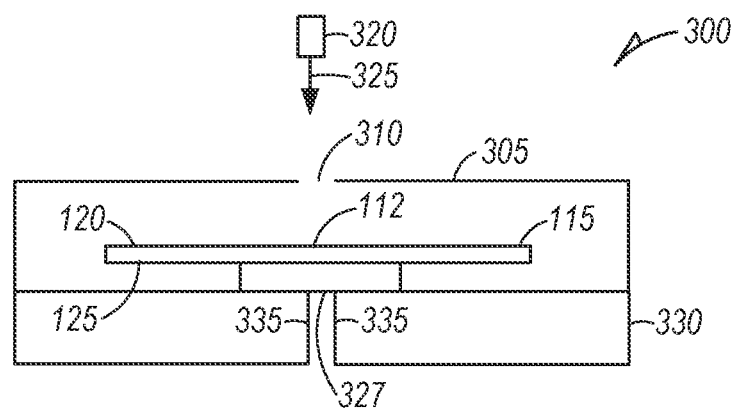
FIGS. 3A and 3B are cross section block diagrams illustrating a scanning system according to an example embodiment.
Figure 3B:
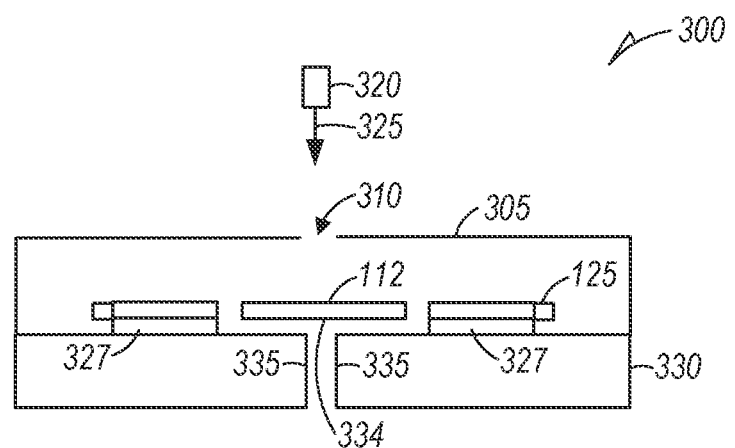

FIG. 3A is a block diagram of a scanning system 300 that includes a side view cross section of mirror assembly 200 taken along lines 2A-2A' of FIG. 2 supported on a substrate 330 via pads 327. FIG. 3B is a block diagram of the scanning system 300 that includes a side view cross section of mirror assembly 200 taken along lines 2B-2B' of FIG. 2. The beams 115 and 120 are shown cantilevered across the cavity 130. The mirror 110 and reflective coating 112 are shown supported by the beams 115 and 120 in the cavity. A cover 305 is coupled to the block 125 to provide protection. In one example, the cover 305 comprises a case that covers the mirror assembly 200.

The cover 305 has an opening 310 that is large enough and aligned to allow lasers 320 to direct laser light 325 toward the reflective coating 112 and allow reflection of the light outside of the cover 305.

Block 125 is supported by the two pads 327 to the substrate 330. As seen in FIG. 3A, the cavity may extend all the way through the block 330 to the substrate 330, which may be non-conductive material, such as a ceramic material. The pads 327 support the block 125 above the substrate 330, allowing for rotation of the reflective coating 112. Broken lines 335 illustrate an opening through the substrate 330 to extend the cavity through substrate 330. The substrate also has an opening 333 with sidewalls 435. Opening 333 aligns with a backside 334 of the mirror 110.

Figure 4A:
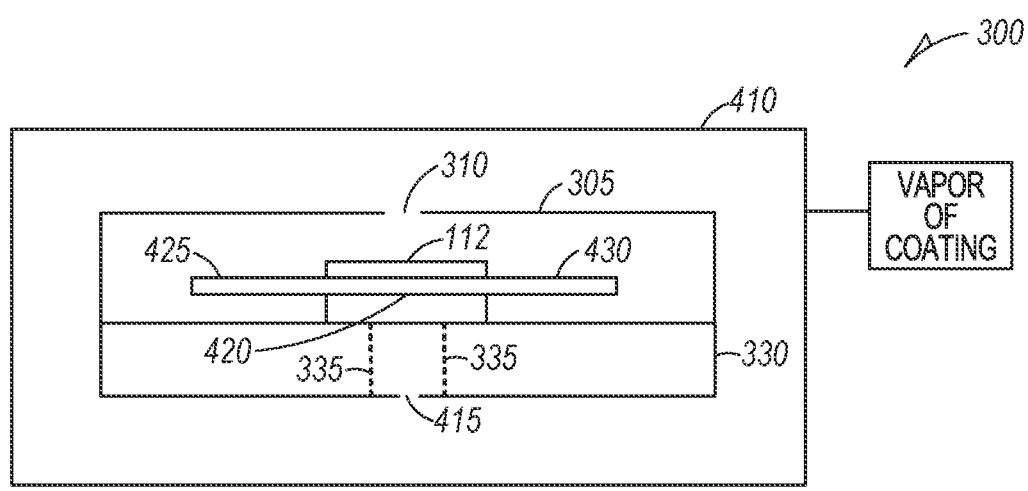
FIGS. 4A and 4B are block diagrams illustrating deposition of a protective coating on a scanning system according to an example embodiment.

FIG. 4A is a block diagram illustrating deposition of a protective coating on scanning system 300 that includes a side view cross section of a mirror assembly 200 taken along lines 2A-2A' of FIG. 2. FIG. 4A illustrates application of a protective coating, that functions as a humidity barrier, utilizing a chemical vapor deposition chamber 410 prior to operation using laser light to perform scanning operations. In one example, the scanning system 300 includes opening 310 in cover 305 and also better illustrates a bottom opening 415 to a backside of bottom 420 of mirror 110. The cover 305 may extend all the way around the scanning device, with opening 415 formed in a back of the cover 305.

To provide a protective coating, such as parylene or other suitable material, the chamber 410 may be reduced in pressure. Other example protective coatings include inorganic materials such as silicon oxide, silicon nitride, and aluminum oxide, and organic materials such as polymeric materials, and other materials that can provide protection and can be etched. In one example, the reduction in pressure is close to a vacuum. The protective coating is introduced in vapor form at 425 and migrates to conformally cover all exposed surfaces with a coating 430 utilizing standard chemical vapor deposition techniques.

Figure 4B:
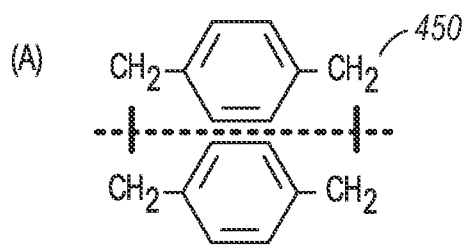
Figure 4B:
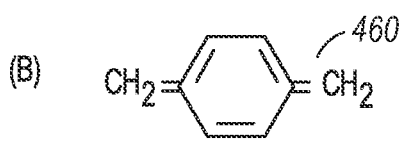
Figure 4B:
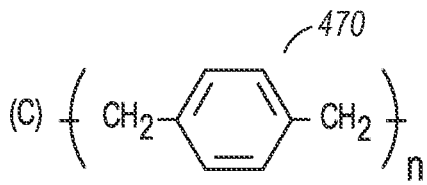
Figure 4B:
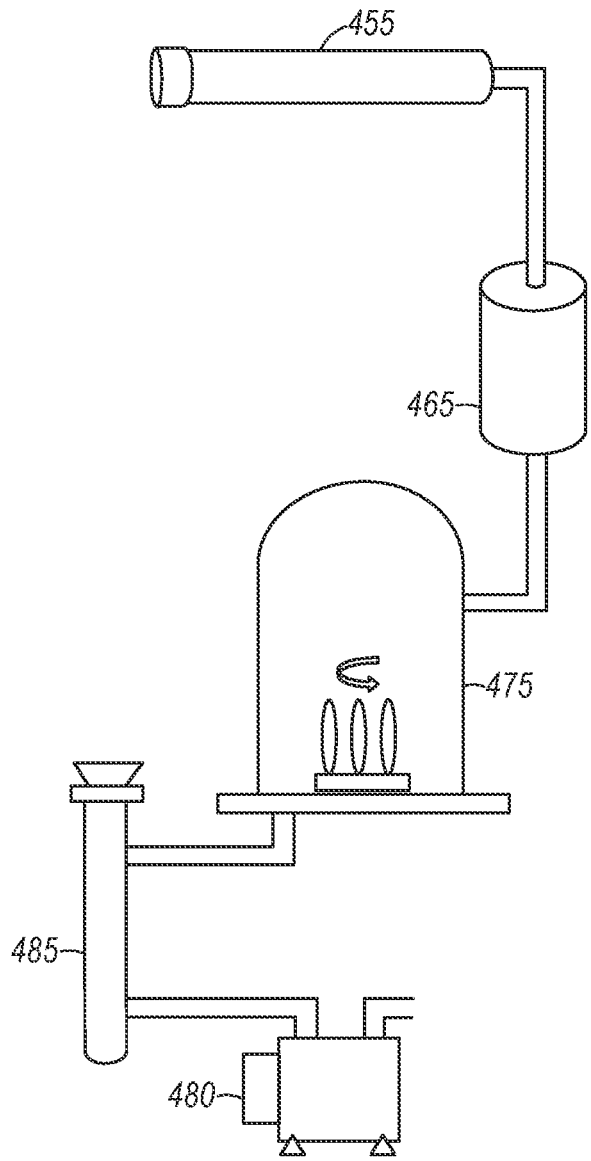

FIG. 4B is a detailed block flow diagram illustrating deposition of Parylene on scanning system 300. Parylene is a unique polymer consisting of a linear chain of Benzene rings with two Methylene groups replacing 2 Hydrogen atoms on opposite sides of the Benzene ring serving as coupling links for the polymer. This film has become known for its imperviousness to water transmission which enables device protection from environmental deterioration via encapsulation and also for its electrical characteristics which are useful for micro-electrical circuitry.

The source material for the deposited film is a dimer 450 form of the parylene molecule in which two monomers are coupled in parallel by the Methylene ends. The dimer 450 is sublimated in a Vaporizer chamber 455, broken into monomer molecules 460 (the vapor) in a Pyrolizer furnace 465 and then deposited as long chain polymers 470 on substrates in a deposition chamber 475.

The Parylene deposition system consists of a series of connected vacuum chambers coupled to a vacuum pump 480 that sequentially produce the parylene vapor, pyrolize it, deposit it as a polymer, and then capture its effluent via a cold trap 485. The Vaporizer chamber 455 in one example is a horizontal tube. The Pyrolizer furnace 465 is a vertical tube connected to the horizontal Vaporizer 455 and is the place that the Dimer vapor is broken into Monomers 460 in preparation for deposition on the substrates in the Deposition Chamber 475.

In one example process, the vaporizer 455 operates at a temperature of around 150° C. The Pyrolizer furnace operates at about 650° C. Deposition occurs at around 20° C. The cold trap 485 may be kept around −70° C. Pressure may be maintained at around 10-35 mTorr.

Example coating 430 thicknesses may be 2.5 microns, 3.6 microns, or any thickness in a range of from 1 to 10 microns or a thickness sufficient to protect sensitive components, such as those formed of PZT, from a humid environment. The thickness can be controlled by the amount of time chemical vapor deposition is performed. Even at thin film thicknesses, the reflectivity of the reflective coating 112 can be reduced and the weight of the film on the mirror 110 (both on the reflective coating 112 top and bottom) can adversely affect the resonant frequency of the rotation of the mirror 110 and hence the reflective coating 112. Multiple scanning device assemblies may be coated at the same time.

Figure 5A:
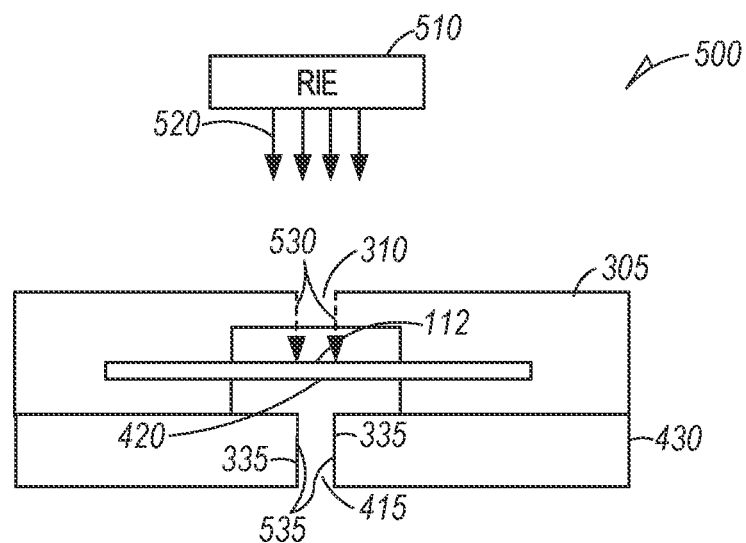
FIGS. 5A, 5B, and 5C are block diagrams illustrating removal of protective coating from the mirror and the bottom of the mirror according to an example embodiment.
Figure 5B:
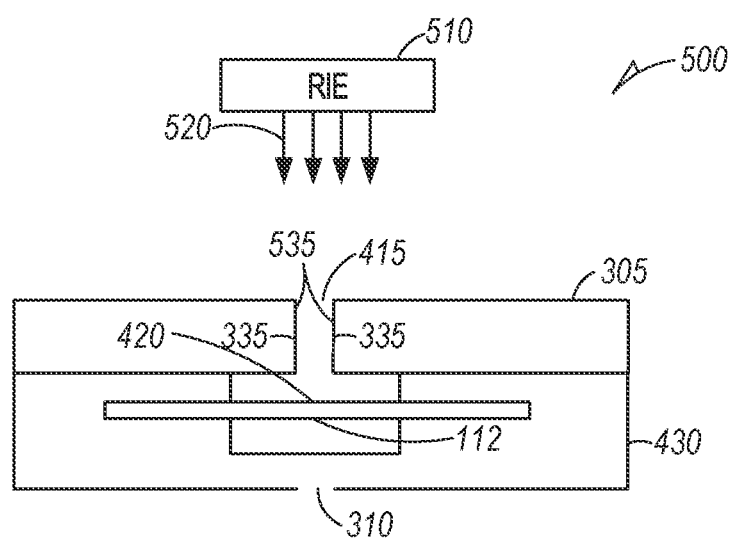

FIG. 5A is a block diagram illustrating removal at 500 of protective coating 430 from the reflective coating 112. FIG. 5B illustrates removal of protective coating 430 from the bottom 420 of mirror 110. In one example, reactive ion etching (RIE) device 510 may be used to pattern or selectively remove portions of the protective coating 430 from the reflective coating 112 using the cover 305 as a self-aligned mask. The cover 305 may be made of a hard plastic, such as a carbon-based injection molded plastic, or other material that is thick enough to not be significantly etched during removal of the protective coating from the mirror.

In one example as shown in FIG. 5B, RIE device 510 is used with the scanning system 300 being turned over after etching one side of the mirror 110 to etch the bottom 420 of mirror 110. The RIE device 510 produces plasma ions, such as oxygen ions, that are illustrated by arrows 520, which also represent the straight path that the ions follow. Openings 310 and 415 serve to allow ions to pass to the top and bottom of the mirror 110 as indicated by pairs of reference lines 530 and 535 which outline the outside range of the ions that impact the protective coating 430 on the reflective coating 112 and on the bottom 420 of the mirror 110. Since the ions travel in a fairly straight path, etching is substantially limited to the sizes of the openings, which are aligned with the mirror support.

Via the RIE process, the protective coating on the reflective coating 112 is removed without affecting the coating outside of the opening 310. The opening 310 is already sized to allow laser generated light to impinge on the rotating mirror 110 reflective coating 112 and reflect light back through the opening 310. The same opening works well for limiting etching to mostly the mirror 110.

Opening 415 is sized to be commensurate with the size of the mirror 110 bottom 420. The ions remove most of the coating on the mirror 110, both from reflective coating 112 and the bottom 420. Since the mirror 110 has a much smaller thickness surface area on edges compared to the top and bottom, protective coating 430 remaining on the edges does not significantly adversely affect reflectivity or resonant frequency of the mirror 110 that supports reflective coating 112. Some protective coating on the edges may also be removed by the RIE ions.

In some examples, etching may be performed only on the mirror 110 reflective coating 112, and changes in resonant frequency due to unetched protective coating on the mirror 110 may be accounted for as a design parameter. In other words, the weight of the remaining protective material may be offset algorithmically or by reducing the weight of the mirror 110 to obtain a desired resonant frequency.

Figure 5C:
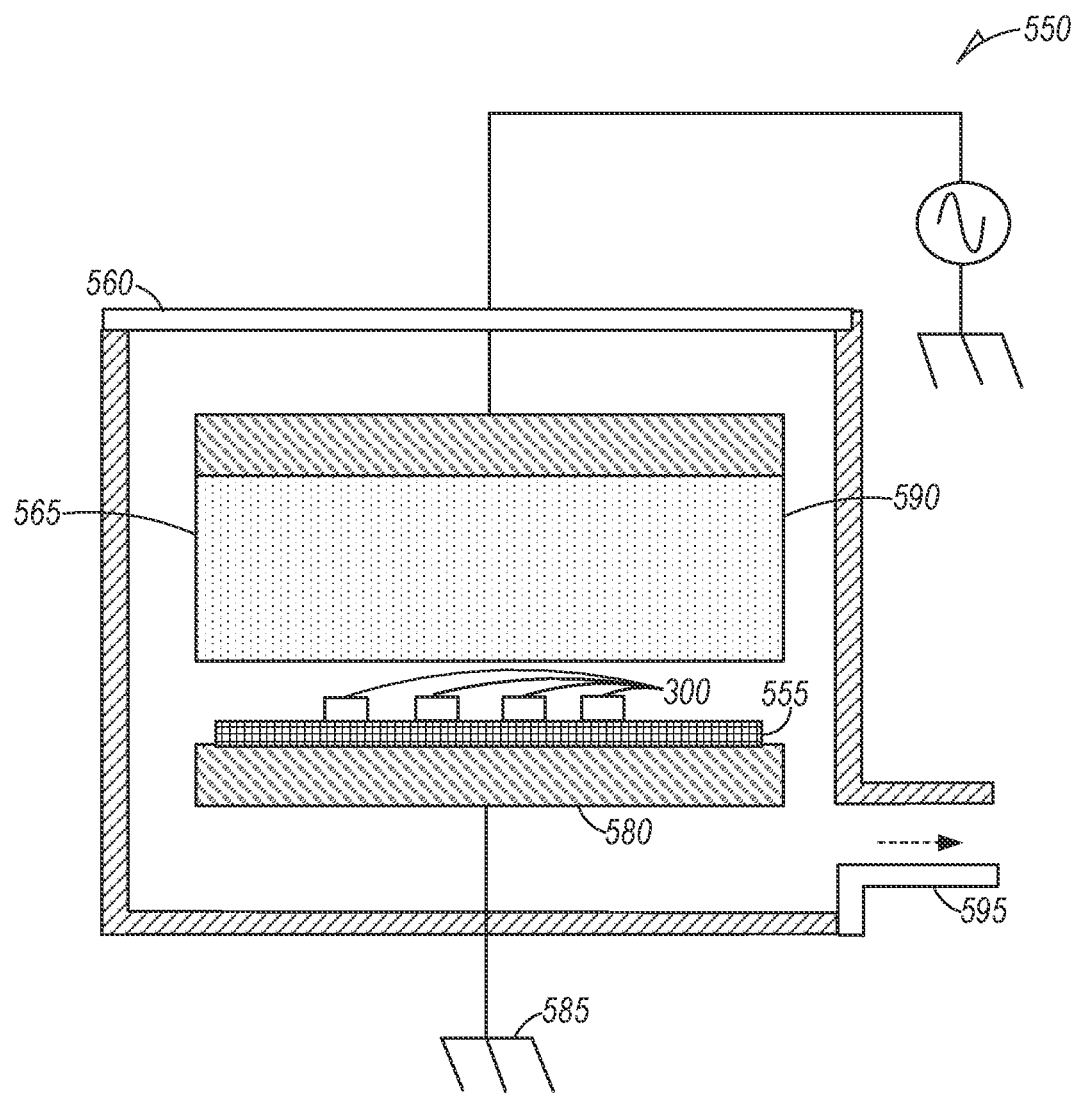

FIG. 5C is a detailed block diagram view of a typical RIE system 550 for performing etching of one or more scanning systems 300 supported on a carrier wafer 555. In one example, system 500 consists of a container 560 forming a process chamber 565. A top electrode 570 is supported within the chamber 565 and is coupled to an RF generator 575. A bottom electrode 580 is coupled to ground 585. The carrier wafer 555 is supported on or near the bottom electrode 580. By applying RF voltage across the electrodes, oxygen plasma 590 is produced and flows between the top and bottom electrodes. A vacuum pump may be coupled via a conduit 595 to the container 560 to control pressure within the chamber 565.

Example pressures for etching Parylene include a chamber 565 pressure of approximately 40 mTorr, RF power of 250 W, and an $O_2$ flow rate of 50 sccm.

Figure 6A:
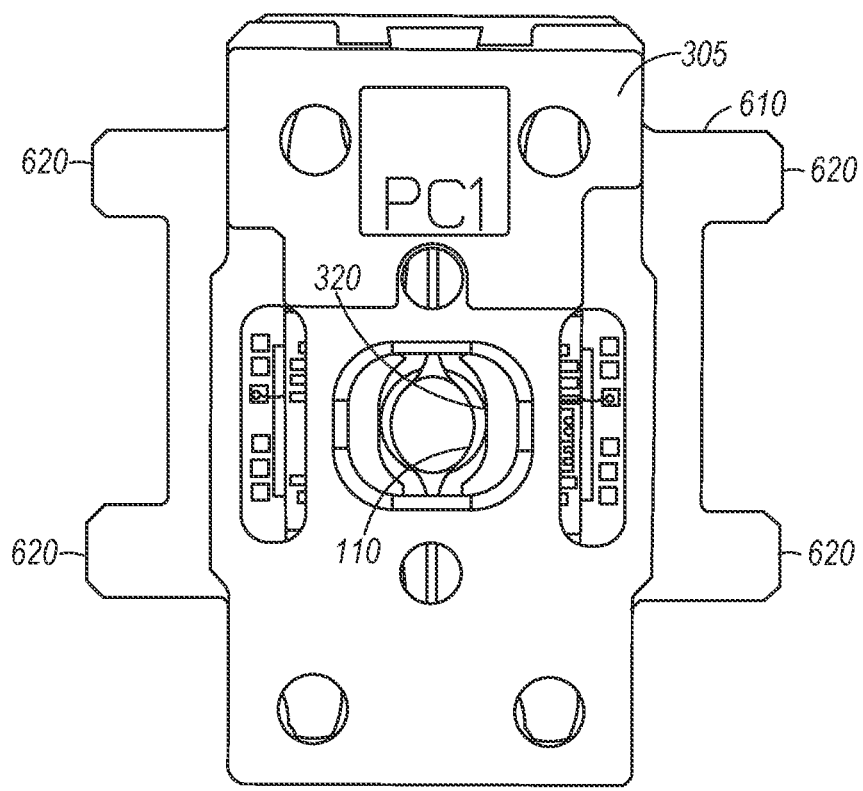
FIGS. 6A and 6B are top views illustrating openings in the scanning system used for patterning the protective coating according to an example embodiment.
Figure 6B:
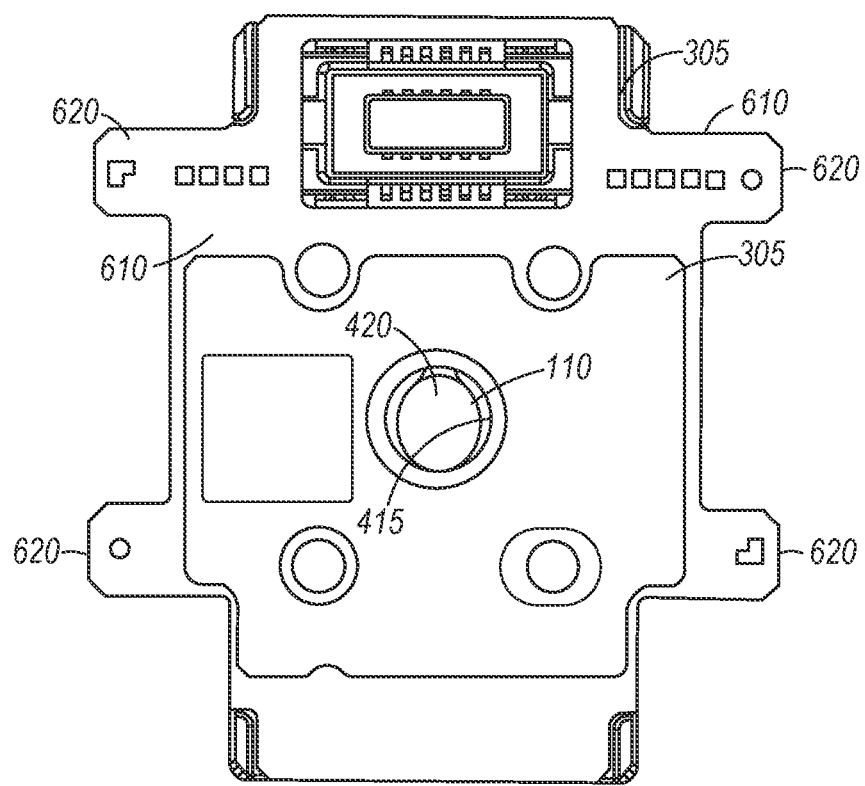

FIG. 6A is a top view of scanning device 400 illustrating opening 310 in cover 305. Reflective coating 112 is also visible through opening 310 illustrating that ions during RIE impact the entire top surface of reflective coating 112 and mirror 110. In various examples, the opening 310 may align directly with the reflective coating 112 surface or the mirror 110 and closely match the size of the reflective coating 112 surface or mirror 110. In one example, a protective tape, such as Kapton tape 610 may be applied to protect the cover 430 and connectors indicated at 620 from being etched and potentially damaged by the $O_2$ plasma during etching.

FIG. 7B is a bottom view of scanning device 400 illustrating opening 415, through which bottom 420 of mirror 110 is etched. The openings 310 and 425 may be slightly smaller or larger than the openings in further examples but should not be so large as to remove protective coating from actuators 210 or sensor 145, or other components that benefit from a protective coating 430.

Figure 7:
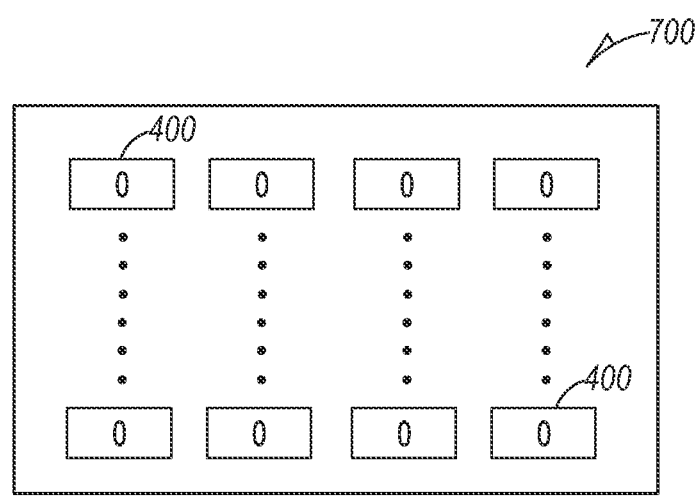
FIG. 7 is a top view of scanning device having an opening for reactive ion etching of a protective layer according to an example embodiment.

Multiple scanning devices may be etched at the same time in a batch process. A fixture 700 may be used to hold the multiple scanning device system 300 and allow turning over the fixture to etch both sides of the mirrors as illustrated in FIG. 7.

EXAMPLES

1. A method includes forming a mirror assembly for a scanning device that includes a mirror rotationally supported by flexible beams, the mirror assembly also including a piezoelectric material. The mirror is encased with a cover having a top scanning opening aligned with the mirror to form a scanning assembly. An interior of the scanning assembly is coated with a protective film. Etching is performed through the top scanning opening to remove the protective film from a top of the mirror.

2. The method of example 1 wherein the scanning assembly has a bottom opening aligned with a bottom of the mirror, the method further comprising etching the mirror through the bottom opening to remove the protective film from the bottom of the mirror.

3. The method of example 2 wherein coating is performed through at least one of the top scanning opening and the bottom opening via a chemical vapor deposition process to form a surface conforming protective coating.

4. The method of any of examples 1-3 wherein the piezoelectric material remains coated by the protective film.

5. The method of any of examples 1-4 wherein the protective film includes parylene.

6. The method of any of examples 1-5 wherein etching the mirror includes reactive ion etching the mirror assembly using the cover as a self-aligned mask.

7. The method of example 6 wherein reactive ion etching is performed using oxygen ions.

8. The method of any of examples 6-7 wherein the cover is formed such that the cover is not significantly etched during etching of the mirror.

9. The method of any of examples 1-8 and further including applying a protective tape to connectors prior to etching.

10. A method includes forming a mirror assembly for a scanning device that includes a mirror rotationally supported by flexible beams, the mirror assembly including a piezoelectric material, supporting the mirror assembly on a substrate having a substrate opening to allow rotation of the mirror, encasing the mirror assembly and substrate with a cover having a top scanning opening aligned with the mirror to form a scanning assembly, coating the scanning assembly with a protective film via chemical vapor deposition, and etching the mirror through the top scanning opening to remove the protective film from a top of the mirror.

11. The method of example 10 wherein the cover has a bottom opening aligned with a bottom of the mirror, the method further comprising etching the mirror through the bottom opening to remove the protective film from the bottom of the mirror.

12. The method of example 11 wherein coating is performed through at least one of the top scanning opening and the bottom opening via a chemical vapor deposition process to form a surface conforming protective coating.

13. The method of any of examples 10-12 wherein the piezoelectric material remains coated by the protective film.

14. The method of any of examples 10-13 wherein the protective film includes parylene.

15. The method of any of examples 10-14 wherein etching the mirror comprises reactive ion etching the scanning assembly using the cover as a self-aligned mask.

16. A scanning device includes a mirror assembly that includes a mirror rotationally supported by flexible beams, the mirror assembly including a piezoelectric material, a substrate supporting the mirror assembly, a case disposed around the mirror assembly and substrate, the case including a top scanning opening aligned with the mirror to form a scanning assembly, and a protective coating conformally deposited on the mirror assembly, substrate, and case, except for an area of the mirror aligned with the top scanning opening.

17. The device of example 16 wherein the substrate includes a substrate opening to allow rotation of the mirror and wherein the substrate includes a bottom opening aligned with a bottom of the mirror and wherein the bottom of the mirror lacks the protective coating.

18. The device of any of examples 16-17 wherein the protective coating includes parylene that has been deposited by chemical vapor deposition.

19. The device of any of examples 16-18 wherein the protective coating has been removed from the mirror via reactive ion etching using the case with the top scanning opening as a self-aligned mask.

20. The device of any of examples 16-19 wherein the protective coating has been removed from an area about the mirror aligned with the top scanning opening and aligned with a bottom opening below the mirror.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
forming a mirror assembly for a scanning device that includes a mirror rotationally supported by flexible beams, the mirror assembly also including a piezoelectric material;
encasing the mirror assembly with a cover having a top scanning opening aligned with the mirror to form a scanning assembly;
coating an interior of the scanning assembly with a protective film; and
etching the mirror through the top scanning opening to remove the protective film from a top of the mirror.

2. The method of claim 1 wherein the scanning assembly has a bottom opening aligned with a bottom of the mirror, the method further comprising etching the mirror through the bottom opening to remove the protective film from the bottom of the mirror.

3. The method of claim 2 wherein coating is performed through at least one of the top scanning opening and the bottom opening via a chemical vapor deposition process to form a surface conforming protective coating.

4. The method of claim 1 wherein the piezoelectric material remains coated by the protective film.

5. The method of claim 1 wherein the protective film comprises parylene.

6. The method of claim 1 wherein etching the mirror comprises reactive ion etching the mirror assembly using the cover as a self-aligned mask.

7. The method of claim 6 wherein reactive ion etching is performed using oxygen ions.

8. The method of claim 6 wherein the cover is formed such that the cover is not significantly etched during etching of the mirror.

9. The method of claim 1 and further comprising applying a protective tape to connectors prior to etching.

10. A method comprising:
forming a mirror assembly for a scanning device that includes a mirror rotationally supported by flexible beams, the mirror assembly including a piezoelectric material;
supporting the mirror assembly on a substrate having a substrate opening to allow rotation of the mirror;
encasing the mirror assembly and substrate with a cover having a top scanning opening aligned with the mirror to form a scanning assembly;
coating the scanning assembly with a protective film via chemical vapor deposition; and
etching the mirror through the top scanning opening to remove the protective film from a top of the mirror.

11. The method of claim 10 wherein the cover has a bottom opening aligned with a bottom of the mirror, the method further comprising etching the mirror through the bottom opening to remove the protective film from the bottom of the mirror.

12. The method of claim 11 wherein coating is performed through at least one of the top scanning opening and the bottom opening via a chemical vapor deposition process to form a surface conforming protective coating.

13. The method of claim 10 wherein the piezoelectric material remains coated by the protective film.

14. The method of claim 10 wherein the protective film comprises parylene.

15. The method of claim 10 wherein etching the mirror comprises reactive ion etching the scanning assembly using the cover as a self-aligned mask.

16. A scanning device comprising:
a mirror assembly that includes a mirror rotationally supported by flexible beams, the mirror assembly including a piezoelectric material;
a substrate supporting the mirror assembly;
a case disposed around the mirror assembly and substrate, the case including a top scanning opening aligned with the mirror to form a scanning assembly; and
a protective coating conformally deposited on the mirror assembly, substrate, and case, except for an area of the mirror aligned with the top scanning opening.

17. The device of claim 16 wherein the substrate includes a substrate opening to allow rotation of the mirror and wherein the substrate includes a bottom opening aligned with a bottom of the mirror and wherein the bottom of the mirror lacks the protective coating.

18. The device of claim 16 wherein the protective coating comprises parylene that has been deposited by chemical vapor deposition.

19. The device of claim 16 wherein the protective coating has been removed from the mirror via reactive ion etching using the case with the top scanning opening as a self-aligned mask.

20. The device of claim 16 wherein the protective coating has been removed from an area about the mirror aligned with the top scanning opening and aligned with a bottom opening below the mirror.

\* \* \* \* \*